Jan. 31, 1961  J. W. E. GRIEMSMANN  2,970,283
BROADBAND SWITCHING JUNCTION
Filed Nov. 26, 1956  3 Sheets-Sheet 1

INVENTOR,
J. W. E. GRIEMSMANN.
BY
Harry M. Saragovitz
ATTORNEY.

Jan. 31, 1961   J. W. E. GRIEMSMANN   2,970,283
BROADBAND SWITCHING JUNCTION

Filed Nov. 26, 1956   3 Sheets-Sheet 2

INVENTOR,
J. W. E. GRIEMSMANN.
BY
Harry M. Saragovitz
ATTORNEY.

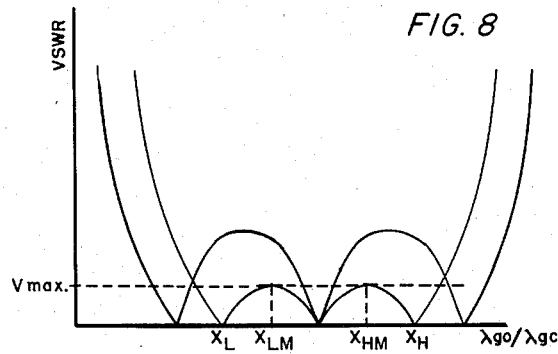
FIG. 8
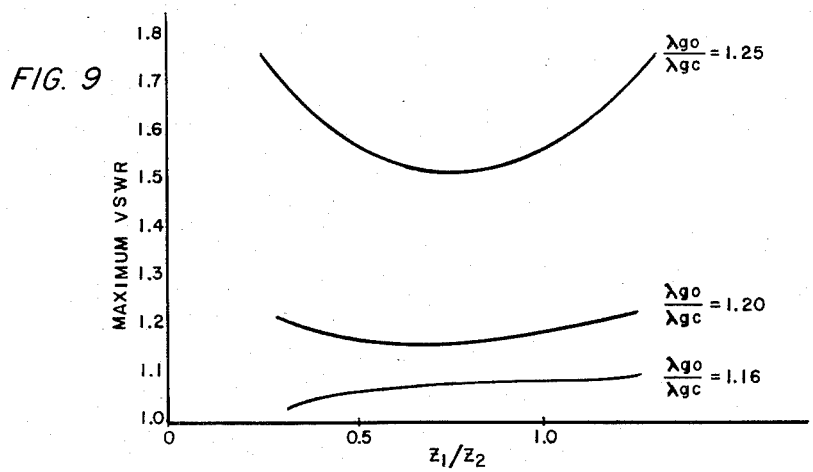
FIG. 9
FIG. 10
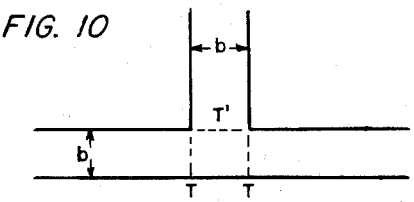
FIG. 11
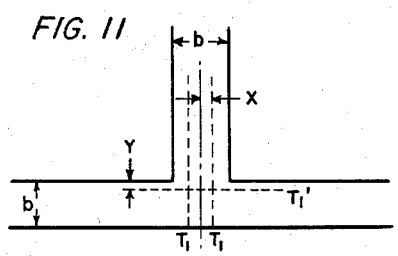
INVENTOR,
J. W. E. GRIEMSMANN.
BY
Harry M. Saragovitz
ATTORNEY.

United States Patent Office 2,970,283
Patented Jan. 31, 1961

2,970,283
BROADBAND SWITCHING JUNCTION

John W. E. Griemsmann, Queens Village, N.Y., assignor to the United States of America as represented by the Secretary of the Army Filed Nov. 26, 1956, Ser. No. 624,479

2 Claims. (Cl. 333—9)

This invention relates to apparatus and methods used in switching junctions of microwave signal transmission systems. More particularly, the invention relates to those switching junctions commonly known as duplexers, and to apparatus for efficiently performing the switching or duplexing over a broad band of frequencies.

An essential unit of a conventional microwave pulse radar system is the arrangement of components commonly called the duplexer. This unit is essentially the microwave equivalent of a low-loss, double-pole, double-throw switch and provides the necessary switching action that enables the use of a common antenna for both transmission and reception of radar signals. In its usual microwave form the duplexer contains two switching tubes connected in a microwave circuit with three terminal transmission lines. These switching tubes differ from each other by virtue of their function. The primary function of the TR or transmit-receiver tube is to disconnect the receiver during transmission, while that of the ATR or anti-transmit-receiver tube is to disconnect the transmitter during reception. In addition, since the transmitter produces pulses of power of the order of $10^6$ watts and the receiver must detect signals of the order of $10^{-12}$ watts, the TR tube must provide a high degree of isolation to protect the sensitive components of the receiver, and the ATR must provide adequate isolation of the transmitter so that almost all of the available received signals will be transmitted to the receiver. Moreover, for the proper performance of the entire radar system these tubes must absorb little power at all times.

The microwave circuits in which these duplexing tubes are incorporated are generally lossless transmission line devices that have the fundamental structure of a three-way transmission line junction. The arms of this three-way junction lead to the antenna, receiver and transmitter with suitable switches placed in the receiver and transmitter arms, as shown in Figure 1.

It is seen from this figure that the three-way junction with the aid of the duplexing tubes is thus required to provide perfect or reflectionless transmission of energy between the transmitter and antenna during transmission and between the antenna and receiver during reception. If the three-way junction is considered to be a simple series or shunt branching circuit, this requirement can be satisfied by the proper location of the TR and ATR tubes. To illustrate this, consider the simple series branching circuit, shown in Figure 2.

Referring to Figure 2, during transmission the line leading to the receiver is short-circuited at the reference plane $T_3$, by the TR tube and the short circuited ATR tube provides the required continuity of line. If the length of the line between the reference planes $T_3$ and $T_4$, is equal to a half-wavelength at the frequency of design, a short is presented at reference plane $T_4$, thus providing perfect transmission between the transmitter and antenna.

On reception it is required that perfect transmission take place from $T_2$ to $T_3$ and this is accomplished by locating the ATR tube a quarter wavelength from $T_5$ so that its impedance referred to $T_5$ will be zero during reception.

At frequencies above or below the particular design frequency, however, the lengths of line associated with the duplexing tube no longer provide the proper impedances for reflectionless transmission. Since reflectionless transmission over a broadband of frequencies is a desirable and necessary property for efficient performance, the design of the branching circuit is an important part of duplexer development.

It is, therefore, an object of this invention to provide an improved branching or switching circuit or junction and, in particular to provide a junction having improved frequency response for broadband operation.

The invention essentially consists of a three-way junction in which each leg of the junction contains either a half-wave transformer or two quarter-wave transformers. Theoretical analysis as well as performance tests indicate that substantial broadbanding is achieved through the use of such a three-way transformer-compensated junction. As is well-known in the art, a transformer in a wave-guide is made by an abrupt change of either or both cross-sectional inside dimensions of the guide.

Before proceeding further with a description of the invention, it is noted that the transformer compensated duplexing junction discussed herein is based on a broadbanding principle evolved in connection with the compensation of a series stub impedance by transformer sections arranged on either side of the stub and originally given in a paper entitled "Microwave Broadbanding" by John W. E. Griemsmann in the "Proceedings of the Symposium of Modern Network Synthesis," published by polytechnic Institute of Brooklyn, April 1952.

The exact nature of this invention as well as other objects and advantages thereof will be readily apparent from consideration of the following specification relating to the annexed drawing in which:

Figures 8 and 9 are performance curves.

Figures 10 and 11 are junction diagrams showing reference planes.

In branched duplexing circuits of waveguide systems the three-way junction is either an E-plane or an H-plane junction. The E-plane junction has some characteristics of a simple series branching circuit while the H-plane junction displays shunt characteristics. Previous investigations indicate that the E-plane type of junction is superior to the H-plane junction with regard to its behavior over a band of frequencies. Moreover, the pure series type of junction has been found to exhibit greater bandwidth characteristics because of the shorter lengths of line between the junction and the duplexing tubes. Consequently, the compensated duplexers of this invention have been confined to the series type of junction.

The double quarter-wave transformer compensated duplexer consists of an E-plane waveguide T-junction that has been modified by the incorporation of two quarter-wavelength transformers in each of the three arms of the T. This modification of the conventional T-junction duplexer gives rise to conditions of impedance match at three frequencies of the operating band instead of merely one as is the case with an uncompensated duplexer. Also the use of the compensating transformers in all arms of the T-junction produces a structure that is symmetrical so as to realize similar frequency response characteristics for both the "transmit" and "receive" conditions.

Figure 1:
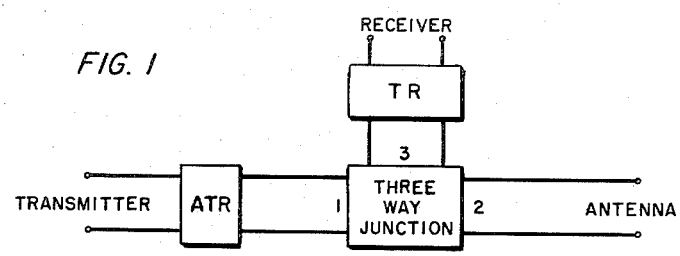
Figures 1 and 2 are schematics of a microwave circuit to which this invention is particularly adapted.
Figure 2:
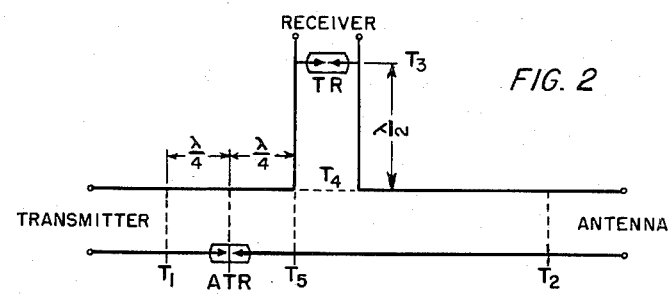
Figure 3A:
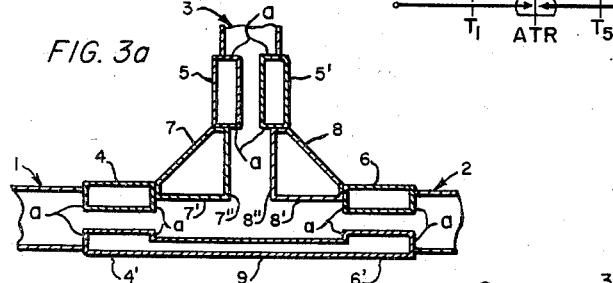
Figure 3a is a schematic cross-sectional view of Figure 3.
Figure 3:
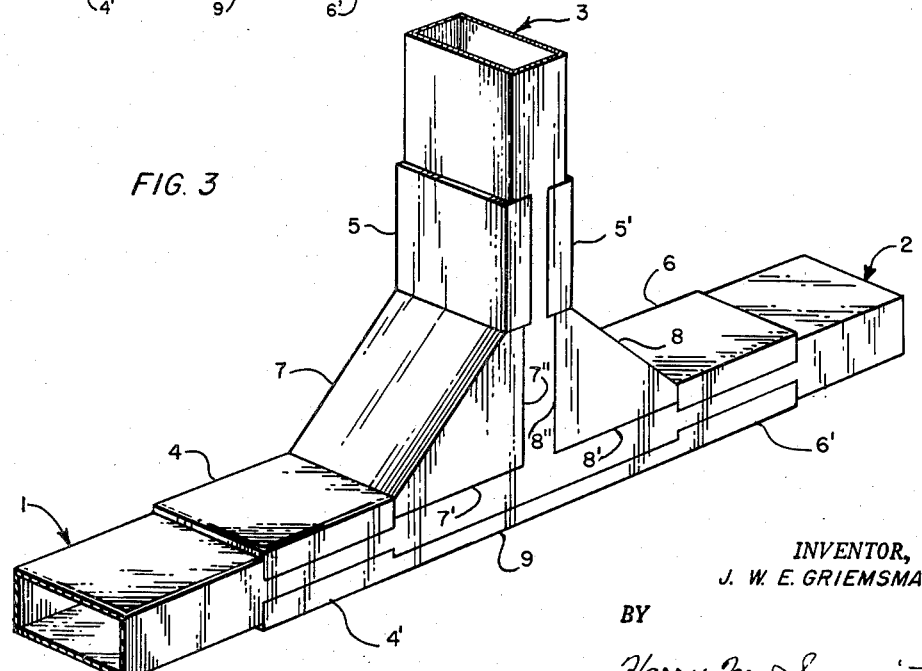
Figure 3 illustrates one embodiment of a microwave coupling junction including the transformer compensation of my invention in which double quarter-wave transformers are used.

Referring now to Figure 3, which shows the double quarter-wave transformer compensated duplexer, there are shown three waveguides 1, 2, and 3 joined by the compensated T-junction of the invention. As shown in the figure, elements 4, 5 and 6 constitute transformer sections each of which has a length of a quarter of a waveguide wavelength at the mid-frequency of the frequency band. In addition, transformer sections 7, 8 and 9 each have a total length of half a waveguide wavelength at the mid-frequency value, transformer sections 7 and 8 having equal portions 7', 7", 8', and 8" of a quarter wavelength each for adjacent waveguides. Transformer sections 4', 5', and 6' are provided in each of the waveguides placed on the opposite side of a waveguide from transformer sections 4, 5 and 6 respectively to achieve the symmetrical structure mentioned above.

Figure 3a is a cross-sectional view of the junction shown in Figure 3, with like numerals designating like parts. A group of adjacent transformer sections can be constructed in any convenient manner, the actual specific construction forming no part of this invention. Proper operation of the device depends only on the discontinuities presented in the waveguides, these discontinuities being shown by the letter $a$ in Figure 3a. As can be seen from Figure 3a, the transformer sections 4, 7, and 5, for example, are fabricated separately and are then placed in appropriate position in the junction as shown. For example, the transformer sections may be constructed of any known metallic waveguide material, the material being for instance cut, stamped, or formed by any known method and then welded or soldered together to form the hollow transformer sections illustrated. The transformer sections are then appropriately attached to each other and to the waveguides 1, 2, and 3 to form the compensated T-junction. Of course, the junction originally formed by waveguides 1, 2, and 3 must be appropriately cut away so that the transformer section may be placed in the T-junction.

Figure 5:
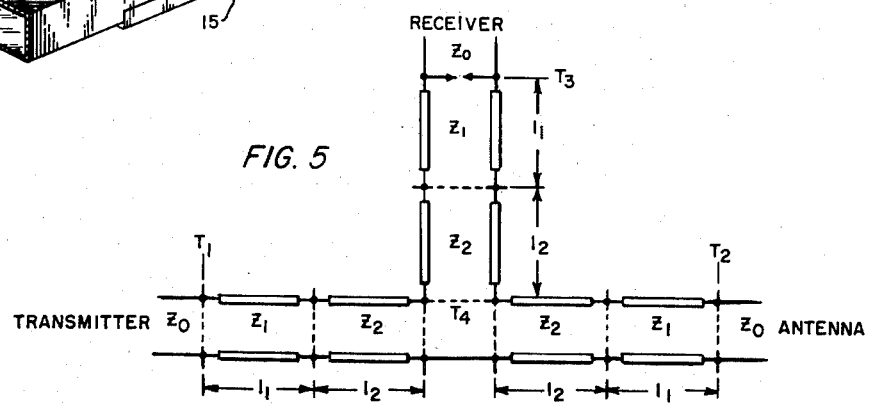
Figures 5 and 6 are schematics of Figures 3 and 4 respectively.

This junction was analyzed on the basis of a simplified or idealized series connected equivalent circuit in order to examine the basic circuit behaviour of the duplexer. This idealized circuit is shown in Figure 5 where: $l_1$ and $l_2$ are each chosen to be a quarter of a waveguide wavelength at the mid-frequency of the desired frequency band, $Z_1$ and $Z_2$ are the characteristic impedances of the quarter-wavelength transformers, and $Z_0$ is the characteristic impedance of the main waveguide system.

Upon utilizing the symmetry of the structure and the reflection coefficient relationships for transmission lines, the conditions for zero input reflection coefficient or a "match" were found to be satisfied by a relationship in which $Z_1/Z_0$ and $Z_1/Z_2$ were dependent on $\lambda g_0/\lambda g_c$ where: $\lambda g_0$=waveguide wavelength at the mid-frequency and $\lambda g_c$=waveguide wavelength at the cancellation frequency.

At the mid-frequency band of the frequency band of interest, i.e., at $\lambda g_0/\lambda g_c=1$, the condition for an impedance match is satisfied for all values of the impedance ratios $Z_1/Z_0$ and $Z_1/Z_2$. This is accounted for by the fact that when the lengths of line are a quarter of a wavelength and the stub impedance at the junction is zero, the transformers provide a perfect match, regardless of the characteristic impedances. It was found that at other frequencies the location of the cancellation points was symmetrical about the mid-frequency, $\lambda g_0/\lambda g_c=1$.

The frequency response of the network is determined partly by the variation of insertion voltage-standing-wave-ratio with frequency. The insertion VSWR varies with waveguide wavelength in the manner shown in Figure 8. In this figure, $X_H$ and $X_L$ denote the wavelength ratios at which cancellation occurs. The location of these points depends on the selection value of the characteristic impedance ratios. A measure of the relative performance of the network is dependent on the maximum VSWR (Vmax.). As can be seen from the two curves shown in Fig. 8, each for a different set of characteristic impedance ratios, the points of maximum VSWR are located approximately midway between the cancellation frequency and the center frequency. The value of these points, then, depends on the characteristic impedance ratio and the bandwidth or location of the cancellation points.

The variation of the maximum VSWR as a function of $Z_1/Z_2$ corresponding to the location of cancellation points at $X_H$ equal to 1.16, 1.20, and 1.25 is shown in Fig. 9. As seen from this figure, these curves indicate that for increased bandwidth, the value of the maximum or peak VSWR increases such that for all practical cases where a maximum allowable VSWR is 1.2, the maximum allowable value of the location of the cancellation points is $$\frac{\lambda g_0}{\lambda g_c}=1.0\pm 0.20$$

The variation of $Z_0/Z_1$ as a function of $Z_1/Z_2$ was calculated for cancellation points at $\lambda g_0/\lambda g_c=1.16$, 1.20, and 1.25. A typical set of values, using $Z_1/Z_2$ as 0.5000 is as follows:

| $\lambda g_0/\lambda g_c$ | 1.16 | 1.20 | 1.25 |
|---|---|---|---|
| $Z_0/Z_1$ | .904 | .957 | 1.228 |

The characteristic impedances of the transformer sections are changed by changing the narrow dimension of the waveguide cross-section with a constant waveguide width. Consequently, using the relationships derived, the various dimensions can accordingly be calculated.

Figure 7:
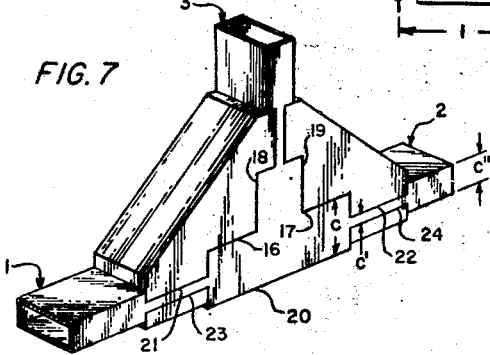
Figure 7 shows another embodiment of a quarter-wave transformer compensated junction.

Since the characteristic impedance ratios are directly proportional to the waveguide height, it is seen that if the ratios $Z_0/Z_1$ or $Z_0/Z_2$ are made less than unity, the height of the guide in the first or second transformer section would be increased over that corresponding to the impedance $Z_0$. The question of the propagation of higher modes than the dominant mode of the waveguide would then have to be considered. It has been found that for best operation of the double quarter wave arrangement, $Z_2$ should be greater than $Z_1$ and also greater than $Z_0$. This arrangement is shown in Figure 7, wherein it is seen that transformer sections 16, 17, 18 and 19 correspond to sections 7', 8', 7", and 8" in Figure 3 while section 20 corresponds to section 9. Similarly, sections 21, 22, 23 and 24 correspond to 4, 6, 4' and 6'. As shown in Figure 7, narrow dimension $c$ corresponding to $Z_2$ is greater than narrow dimension $c'$ corresponding to $Z_1$ and also greater than narrow dimension $c''$ corresponding to $Z_0$.

Figure 4:
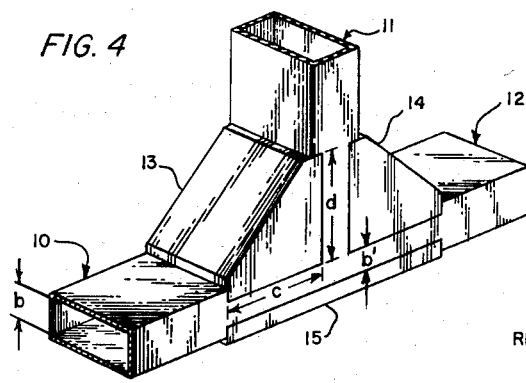
Figure 4 illustrates a second embodiment of a microwave coupling junction including transformer compensation in which half-wave transformers are used.

Figure 4 shows a half-wave transformer compensated junction in which 10, 11, and 12 are three waveguides joined by the compensated T-junction including transformer sections 13, 14 and 15. The length of transformer section 13 in guides 10 and 11 (lengths $c$ and $d$, respectively) is taken to be half of a waveguide wavelength at the mid-frequency of the frequency band. This is also true of transformer section 15 with regard to guide 10 and 12 and of transformer section 14 with regard to guides 11 and 12.

Cross-sectional views of Figures 4 and 7 would be similar in nature to Figure 3a. For this reason, these cross-sectional views are not shown in separate figures.

Figure 6:
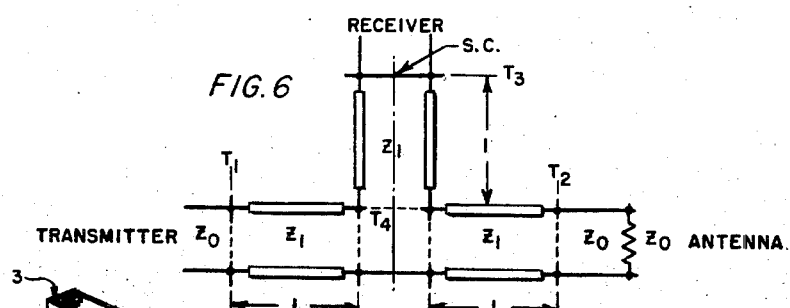

A schematic representation of the circuit of Figure 4 is shown in Figure 6. It is seen that the half-wavelength transformer compensated junction is actually a degenerate or special case of the analysis of the circuit of Figure 5 wherein the impedance ratio $Z_1/Z_2$ is made equal to unity. In the case of Fig. 6, each of the lengths $l$ is equal to one half of a waveguide wavelength at the mid-frequency of the frequency band.

In the case of a half-wavelength transformer compensated duplexer the location of the cancellation points occur in pairs and are located symmetrically about the center frequency where $\lambda g_0/\lambda g_c=1.0$ as in the case of the quarter-wave compensated junction. Also, the maximum of reflection coefficient for values of $$\frac{\lambda g_0}{\lambda g_c}$$

between 1.0 and the cancellation point also occurs approximately midway between the center frequency and the cancellation frequency with the variation again being symmetrical. For a representative design, the cancellation points were selected to be at values of $\lambda g_0/\lambda g_c$ equal to 1.16 and 0.84, giving rise to a characteristic impedance ratio $z_0$ of 1.329 where $$z_0 = Z_0/Z_1$$

Representative dimensions are given below using the above criteria for standard X-band rectangular waveguide, RG-52/U which operates in the frequency range of 8.20-12.40 kmc. and has inside dimension of 0.900" x 0.400"; for a design center frequency of 9.00 kmc., the waveguide wavelength in the guide is 4.9164 cm.

Utilizing the fact that the characteristic impedance of uniform rectangular waveguide is directly proportional to the narrow-dimension, $b$ (Fig. 4) of the waveguide (all other variables being constant), the narrow dimension, $b'$ (Fig. 4) of the half-wavelength transformer can be calculated to be:

$$\frac{b}{b'} = \frac{Z_0}{Z_1} = 1.329 = \frac{.400}{b'}$$

$$b' = 0.3 \text{ inch}$$

Due to certain approximations and assumptions made in the analysis of the right-angle, E-plane, T-junction in rectangular waveguide the lengths of the transformers in each of the waveguides may not be exactly one-quarter and one-half wavelength. For instance, in order to simplify the equivalent circuit it is necessary to make a transformation of the reference planes. This transformation is described in "Waveguide Handbook," by N. Marcuritz, McGraw-Hill, 1951, pp. 346-350. Ordinarily, the reference planes for the analysis are as shown in Fig. 10, which is a cross-section of T junction with reference planes at T, T, T', with $b$ being the narrow dimension of the waveguide. In order to simplify the equivalent circuit representation of the junction, a transformation of the reference planes results in a cross-section as shown in Figure 11, wherein $T_1$, $T_1$, and $T'_1$ are the transformed reference planes. For the RG-52/U waveguide used above in the design of a representative junction, the reference planes are situated at distances from the edge of the waveguide as shown in Figure 11 with Y=0.0345 in. x=0.022 in. Therefore, the portions of the transformers within the various guides are actually different from one-half wavelength in length by the amounts indicated in Figure 11. Thus, the length $c$ and $d$ shown in Figure 4 will each be an effective one-half wavelength for the appropriate reference planes of the junction but may be physically shorter.

The junction of the main waveguide and the transformer creates a step discontinuity due to the abrupt change in the height of the waveguide. This discontinuity introduces a shunt capacitance whose magnitude is dependent on the relative heights of the waveguides, the frequency, and the alignment of the waveguides. The introduction of this shunt capacitance will affect the impedance match or the insertion VSWR of the structure. Compensation for the introduction of this shunt capacitance can be attained by shortening the lengths of the transformers. This therefore, will also cause the transformers to be different in actual physical length from one-half wavelength.

The design criteria to determine the effectiveness of the transformer compensated junction are the maximum allowable insertion VSWR and the branching loss. The VSWR is that between magnetron and antenna lines with the ATR shorted out and with the receiver arm, having the TR fired, acting as a shorted stub. The branching loss is considered to be the reflection loss measured in the antenna arm with the magnetron arm acting as a shorted stub.

When measurements of VSWR as above defined were made, a decided improvement was shown of the variation of insertion VSWR of the compensated junction over that of the uncompensated junction. This is illustrated by the bandwidth of the junctions obtained for a given VSWR. For transmission between the parallel arms of the junctions, a VSWR of 1.16 gives a bandwidth of 19.34% for the compensated as compared to 6.61% for the uncompensated junction, an increase of threefold. For transmission between the sidearm and any parallel arm for a VSWR of 1.24, the compensated junction has a bandwith of 16.25% while the uncompensated junction's minimum attainable VSWR is 1.33. The bandwidth here considered is defined as Percentage bandwidth $\frac{L-H \times 100}{H \times L}$ Where $L=$ free space wavelength at lower frequency limit.
$H=$ free space wavelength at upper frequency limit.

This data is for the half-wavelength transformer compensated junction with the dimensions given above.

It is thus seen that a new and improved switching junction has been disclosed in which the provision of the symmetrically placed sections of half-wave or quarter-wave transformers allows the achievement of broadband operation of the junction.

It is understood of course that the particular configuration shown is not meant to be limiting so long as transformers of the proper length are used. As stated above, a transformer in a waveguide is made by an abrupt change of either or both cross-sectional inside dimensions of the guide in order to achieve a discontinuity. In Figures 3 and 4, for ease of fabrication, this is achieved by cutting out sections of the waveguide and inserting metal blocks (such as shown at 4, 5, 7, and 13) to create the abrupt change in inside dimensions. As far as proper operation is concerned, however, the abrupt change could just as well be achieved by forming the waveguide itself with the abrupt change in dimensions provided that the proper length of the changed dimension is used. The metal blocks are hollow in order to conserve metal and weight. Various modifications are contemplated and may obviously be resorted to by those skilled in the art without departing from the spirit and scope of the invention, as hereinafter defined by the appended claims, as only preferred embodiments thereof have been disclosed.

What is claimed is:

1. In combination in a broadband duplexing system, a signal transmitter, a signal receiver, a common transmitting and receiving antenna, a first waveguide line connecting said transmitter to said antenna, a second waveguide line connecting said receiver to said first waveguide line at a point between said transmitter and said antenna, said first and second waveguide lines thereby forming a three-arm E-plane T junction, and transformer sections symmetrically placed in each of said arms substantially at the junction of said T, each of said transformer sections being a half wave-length at the center frequency of the operating frequency band, each of said waveguides having a characteristic impedance $Z_0$ and a narrow dimension $b$ proportional thereto, each of said transformer sections having a characteristic impedance $Z$, and a narrow dimension $b^1$ proportional thereto, said impedance $Z_0$ being greater than said impedance $Z$ and being related thereto by the following relationship:

$$\frac{b}{b^1}=\frac{Z_0}{Z}$$

2. In combination in a signal duplexing system operating broadband, a signal transmitter, a signal receiver, a common transmitting and receiving antenna, three symmetrical transformer sections forming an E-plane T junction, each of said transformer sections being one half wave-length at the center frequency of the operating frequency band and having a characteristic impedance $Z$, wave guides connecting said receiver, said transmitter and said antenna to the respective transformer sections, each of said waveguides joining the respective transformer section symmetrically, and each of said waveguides having a characteristic impedance $Z_0$ greater than said impedance $Z$.

References Cited in the file of this patent

UNITED STATES PATENTS

| | | |
|---|---|---|
| 2,438,367 | Keister | Mar. 23, 1948 |
| 2,496,865 | Fiske | Feb. 7, 1950 |
| 2,531,437 | Johnson et al. | Nov. 28, 1950 |
| 2,643,296 | Hansen | June 23, 1953 |
| 2,790,959 | Small | Apr. 30, 1957 |
| 2,801,390 | Dairiki | July 30, 1957 |
| 2,816,270 | Lewis | Dec. 10, 1957 |

OTHER REFERENCES

"Technique of Microwave Measurements," McGraw-Hill Book Co., New York, 1947, edited by Montgomery.

"Microwave Duplexers," Smullin and Montgomery, McGraw-Hill Book Co., New York, 1948; pages 262–274 relied on.

Griemsmann: "Microwave Broadbanding" in Proceedings of the Symposium on Modern Network Synthesis, New York, N.Y., 1952; pages 328–334 relied on.